UNITED STATES PATENT OFFICE.

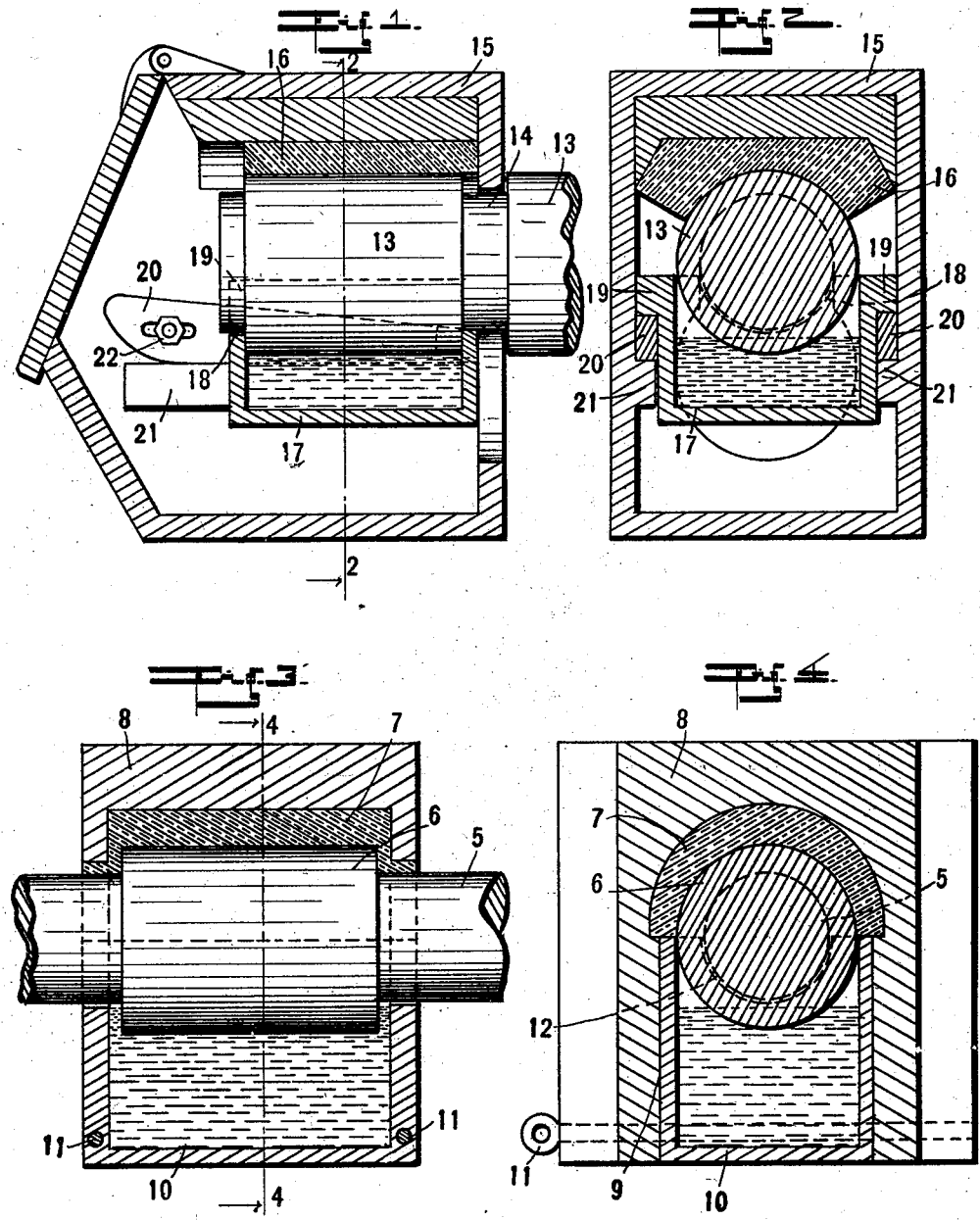

JAMES N. EVERETT, OF PACIFIC, MISSOURI.

BEARING.

SPECIFICATION forming part of Letters Patent No. 702,641, dated June 17, 1902.

Application filed June 17, 1901. Serial No. 64,795. (No model.)

*To all whom it may concern:*

Be it known that I, JAMES N. EVERETT, a citizen of the United States, residing at Pacific, in the county of Franklin and State of Missouri, have invented a new and useful Bearing, of which the following is a specification.

My invention relates to an improved means for insuring the continuous lubrication of a bearing and shaft rotatable therein.

The object of my invention is to produce a simple yet efficient device by means of which a liquid lubricant may be maintained with its level within the radius of the cross-sectional area of the shaft, and my device has been particularly designed for use in connection with that class of bearings in which the shaft supports the bearing, as in railroad and locomotive trucks, although my device is not necessarily limited to such use.

The accompanying drawings illustrate my invention.

Figure 1 is a central axial section of one end of a car-axle and the accompanying bearing and inclosing box. Fig. 2 is a section on line 2 2 of Fig. 1. Fig. 3 is a central axial section of a portion of a driver-axle of a locomotive and inclosing boxing and bearing. Fig. 4 is a section on line 4 4 of Fig. 3.

In Figs. 3 and 4, 5 indicates the driver-axle, provided with one or more enlarged portions 6, upon which rests in the usual manner the brass 7, contained in the bearing-block 8. As is usual, the bearing-block 8 is provided with an open slot 9, leading upward from its bottom to the brass 7, and fitted within said slot is an oil-cellar 10, which may be held up in position by any suitable means, such as pins 11, passing through the bearing-block 8 and the cellar 10. Cellar 10 has an internal length equal to or slightly greater than the length of the enlarged portion 6 of axle 5, as clearly indicated in Fig. 3, and the end walls of said cellar are provided with substantially semicircular notches 12 of a radius substantially equal to the radius of the smaller portion of the axle 5. By this arrangement oil placed in cellar 10 will have a normal level up to the lowest point of notches 12, and this will be nearer the axis of the axle than the periphery of the enlarged portion 6, so that when the cellar is placed in position the lowest portion of part 6 will lie continuously in oil.

In Figs. 1 and 2 the construction is substantially identical, but is slightly modified in order to adapt it for use in connection with the usual truck-axle, where the bearings are at the extreme ends of the axle. In these two figures, 13 indicates the axle, and 14 indicates a peripherial groove formed in said axle, at some distance from the end thereof. The usual box 15 is provided with the usual brass 16, which rests upon the end of axle 13. The oil-cellar 17 is similar to the cellar 10, already described, having an internal length equal to or slightly greater than the length of that portion of the axle 13 between its end and groove 14. The end walls of cellar 17 are notched at 18 with a substantially semicircular notch having a radius substantially equal to the radius of the axle 13 at the bottom of groove 14. For convenience in holding the cellar in position its side walls may be provided with projecting flanges 19, beneath which may be inserted wedges 20, which rest upon ribs 21, formed in the interior of boxing 15. Each wedge may be held in position by a suitable bolt 22.

It will be noticed that in each of these constructions the oil-level may be brought up to the lowest point of the notches in the end walls of the cellar and that in each case these lowest points may be brought closer to the axis of the axle than the periphery of the portion which is to be lubricated, and herein lies what I conceive to be the principal feature of novelty of my device. By this arrangement the oil is continuously in engagement with a portion of the shaft or axle, and immediately upon movement of the shaft or axle in either direction a copious supply of oil is carried up thereby to the bearing.

I claim as my invention—

A bearing comprising a suitable axle-box, an oil-cellar confined within the same, lateral flanges formed with the walls of the cellar, ribs disposed along the inner walls of the box below the flanges, wedges interposed between the flanges and ribs, means for securing the wedges to the walls of the box, an axle having an enlarged portion confined within the oil-cellar, and having a peripheral groove exterior thereto snugly embraced by the walls of the openings formed in the axle-box and oil-cellar respectively, substantially as set forth.

JAMES N. EVERETT.

Witnesses:
HOMER CALKINS,
JAMES HOGAN.